United States Patent
Robinson

[15] 3,706,934
[45] Dec. 19, 1972

[54] APPARATUS FOR LINEARIZING A NON-LINEAR SIGNAL

[72] Inventor: Robert W. Robinson, Phoenix, Ariz.

[73] Assignee: Sperry Rand Corporation

[22] Filed: Jan. 28, 1971

[21] Appl. No.: 110,694

[52] U.S. Cl. ...................328/1, 328/46, 307/225
[51] Int. Cl. .............................................H03k 17/00
[58] Field of Search ............328/41, 46, 48; 307/225

[56] References Cited

UNITED STATES PATENTS

| | | | |
|---|---|---|---|
| 3,241,017 | 3/1966 | Madsen et al. | 328/48 X |
| 3,381,227 | 4/1968 | Kovanic | 328/48 X |
| 3,484,699 | 12/1969 | Israel | 328/46 |

Primary Examiner—Stanley D. Miller, Jr.
Assistant Examiner—B. P. Davis
Attorney—S. C. Yeaton

[57] ABSTRACT

Linearizing apparatus comprising a controllable frequency divider responsive to the signal to be linearized for providing a second signal with frequency selectively controlled multiples of the input signal to be linearized. A pulse counter accumulates the cycles of the second signal and controlling means responsive to the count conditions attained by the pulse counter selects the controlled multiples in accordance with the attainment of predetermined count conditions.

18 Claims, 8 Drawing Figures

INVENTOR
ROBERT W. ROBINSON
BY
*H P Terry*
ATTORNEY

INVENTOR
ROBERT W. ROBINSON
BY
H.P. Terry
ATTORNEY

APPARATUS FOR LINEARIZING A NON-LINEAR SIGNAL

BACKGROUND OF THE INVENTION

1. Field of the Invention

The present invention pertains to apparatus for linearizing a non-linear signal derived, for example, from a pressure sensor providing a signal whose frequency varies as a non-linear function of pressure such as disclosed in U.S. Pat. No. 3,456,508, entitled, "Vibrating Diaphragm Pressure Sensor Apparatus" by Richard H. Frische, issued July 22, 1969, and assigned to the assignee of the present invention.

2. Description of the Prior Art

Prior devices are known from which non-linear signals are derived, such devices providing signals whose frequencies vary as non-linear functions of a variable. Devices of this character include, for example, pressure sensors of the type providing a signal whose frequency varies as a non-linear function of pressure.

A pressure responsive transducer of this type might provide atmospheric pressure data, for example, to an altitude indicating system. Because of the generally non-linear response of the transducer, a linear indicating device such as a pulse counter, for counting the cycles of the non-linear signal, cannot conveniently provide a direct indication of altitude. Linearizing means are therefore required to facilitate the use of non-linearly responding transducers with readily available linear indicating systems.

Apparatus is known that linearizes a transducer response curve on a point by point basis. Circuits of this nature do not provide the accuracy required in an altitude indication system. Furthermore, when malfunction requires replacement of a transducer, the linearizing circuits may require rewiring or replacement since transducer response curves vary from one transducer to another.

SUMMARY OF THE INVENTION

The present invention contemplates linearizing a non-linear signal derived, for example, from a pressure transducer having a non-linear frequency versus pressure response curve.

The derived non-linear transducer response curve can be accurately approximated by a sequence of linear segments, each segment possessing a different slope. A controllable frequency divider, responsive to the signal derived from he transducer, alters the frequency thereof by a different predetermined multiple for each segment. The predetermined multiples are chosen so that the slope of each segment is converted to a reference slope. The frequency divider thereby provides a second signal with frequency a selected multiple of the frequency of the signal derived from the transducer.

A pulse counter responsive to the second signal provides count condition signals representative of the number of cycles counted of the second signal. Controlling means responsive to the count condition signals change the predetermined multiple whenever a count condition is attained representative of the starting coordinate or breakpoint of a segment of the segmented derived transducer response curve. Thus, the segmented derived response curve of the transducer is accurately linearized.

The circuit interconnections that select the count conditions as well as those that select the predetermined multiples are constructed on wiring boards adapted to be plugged into the circuits of the linearizing device. The boards are mounted with the transducer on a pluggable mounting member so that the linearizing parameters are changed whenever one transducer is replaced with another.

DESCRIPTION OF THE PREFERRED EMBODIMENT

The present invention comprises apparatus for linearizing a non-linear signal. A non-linear signal may be defined as an oscillatory signal whose repetition frequency is a non-linear function of a variable. The oscillatory signal may be applied to the apparatus through a fixed width gate. If the cycles of the gate oscillatory signal are converted to pulses, groups or pulses are applied to the apparatus, the number of pulses in the groups varying as the non-linear function.

The term non-linear signal may also be defined as groups of fixed frequency clock pulses applied to the apparatus through a gate whose width varies as the non-linear function. Thus, in a manner similar to that of the previously given definition, groups of pulses are applied to the apparatus, the number of pulses in the groups varying non-linearly.

A non-linear signal in accordance with the latter definition may be derived, for example, from a pressure sensor of the type described in said U.S. Pat. No. 3,456,508. This sensor provides a cyclic signal with repetition frequency varying as a non-linear function of pressure. Although the present invention is adaptable to linearizing a wide variety of non-linear signals, the invention will be described in terms of a non-linear signal derived from the pressure sensor of said U.S. Pat. No. 3,456,508 for purposes of explanation.

Figure 1:
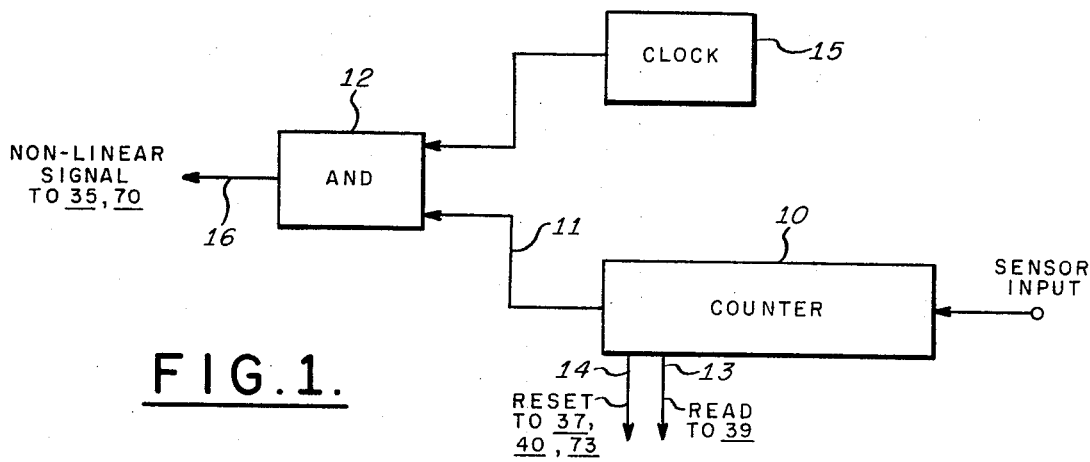
FIG. 1 is a block schematic diagram illustrating preferred means for deriving a non-linear signal from a condition sensor output.

Referring to FIG. 1, apparatus is illustrated for converting the output of the cited pressure sensor to a non-linear signal suitable for application to the linearizing apparatus of the invention. The sensor output is applied to the input of a conventional binary counter 10, the last stage of which provides an enabling signal on a lead 11 to an AND gate 12. Leads 13 and 14 connected to intermediate stages of the counter 10 provide read and reset signals, respectively, in a conventional manner, A source 15 provides fixed frequency clock pulses to the AND gate 12 which in turn provides the signal to be linearized on a lead 16. It is appreciated that since the lead 11 is connected to the last stage of the counter 10, the enabling signal on the lead 11 functions as a variable width gating signal with respect to the clock pulses from the source 15.

Figure 4:
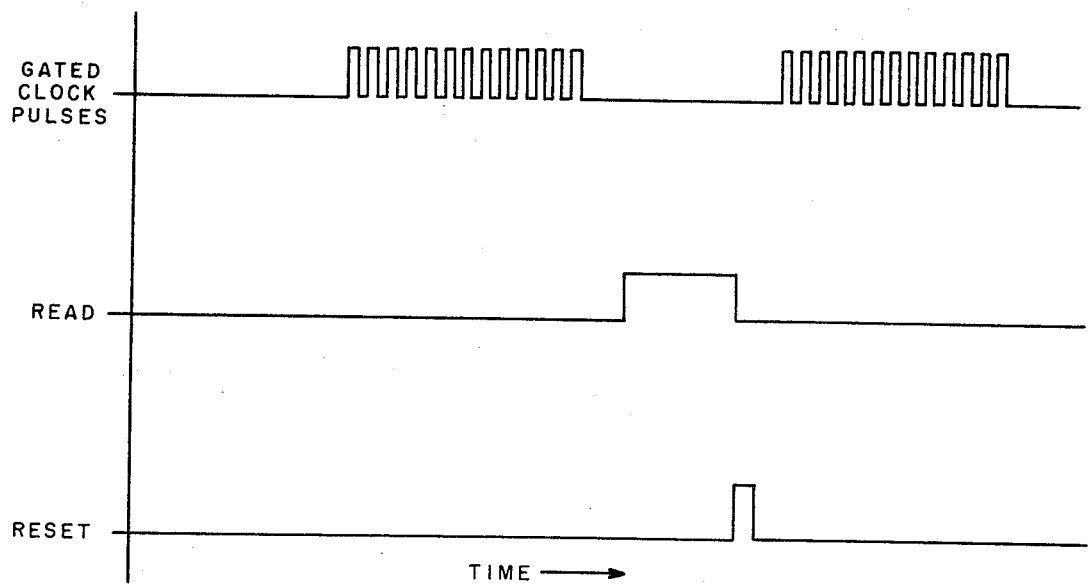
FIG. 4 is a waveform timing diagram showing the time relationships between waveforms appearing at various points of FIG. 3.

In operation, the AND gate 12 transmits clock pulses to the lead 16 for a time duration equal to a predetermined number of cycles of the sensor signal. After transmitting the group of clock pulses, the AND gate 12 is disabled for an equal time interval. Thus groups of pulses are transmitted to the lead 16, the numbers of pulses in the groups varying as a non-linear function of the pressure detected by the sensor. The read and reset signals on the leads 13 and 14, respectively, and the gated clock pulses on the lead 16 are provided in accordance with the waveforms illustrated in FIG. 4 for reasons to be discussed.

It is appreciated that the apparatus of FIG. 1 is utilized to advantage to provide enhanced altitude resolution when employing a pressure sensor of the type described in said U.S. Pat. No. 3,456,508. A sensor of this type provides an output frequency range of about 2 kilohertz corresponding to the range of atmospheric pressures normally encountered. Such a frequency range is normally not adequate to provide the required resolution in altitude indicating systems for use in modern aircraft. The apparatus of FIG. 1 enhances the altitude resolution by utilizing a predetermined number of cycles of the sensor output signal to gate the high frequency clock pulse signal from the source 15 to the lead 16 as explained.

Figure 2:
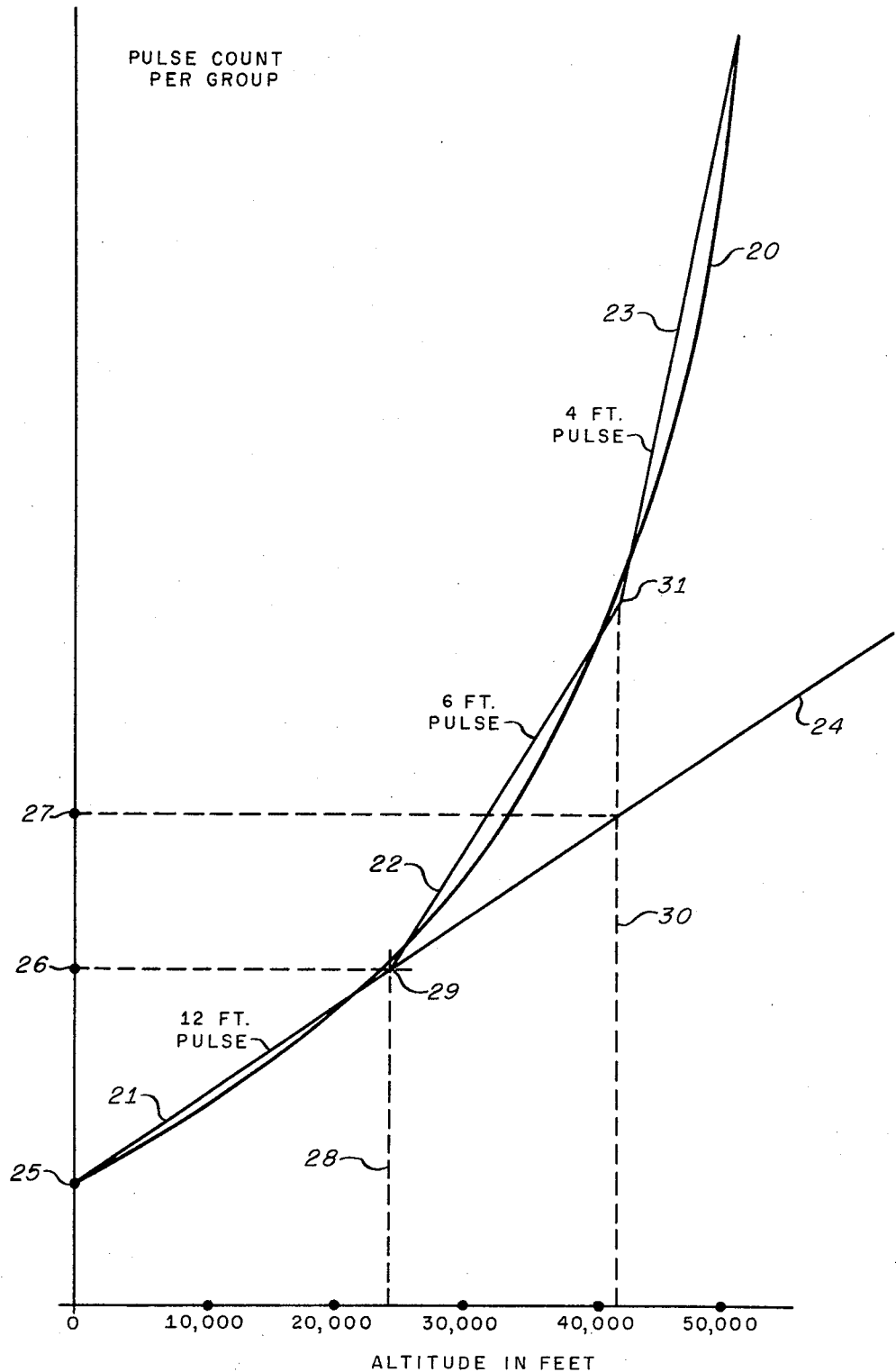
FIG. 2 is a graph of altitude versus pulse count for a typical condition sensor indicating appropriate linearizing segments and showing a resultant linear calibration curve.

Referring to FIG. 2, a curve 20 is illustrated representing pulse count per group as a non-linear function of altitude. The curve 20 may be closely approximated, in accordance with the present invention, by linear segments 21, 22 and 23. The segment 21 has a slope in accordance with a gradient of 12 feet of altitude per pulse. The segments 22 and 23 have slopes in accordance with the gradients of 6 feet per pulse and 4 feet per pulse respectively. It should be noted that care must be taken in selecting the straight line approximations so that the resultant gradients have integral values. This is not difficult to achieve since a fractional valued slope may be converted to two slopes having integral values without an increase in error. An additional inflection point is, however, required. For example, a slope of 7.5 feet per pulse may be changed to two slopes of 6 and 8 feet per pulse respectively. The apparatus of the present invention converts the slopes of the segments 21, 22 and 23 to a reference slope thereby providing the desired linear function. The reference slope may, for convenience, be chosen equal to the slope of the segment 21. Thus the desired linear function 24 corresponding to the non-linear function 20 is illustrated.

It is noted that a count exists where the curve 20 intersects the pulse count axis at zero altitude. The apparatus of the present invention compensates for this zero altitude count in a manner to be explained.

Figure 3:
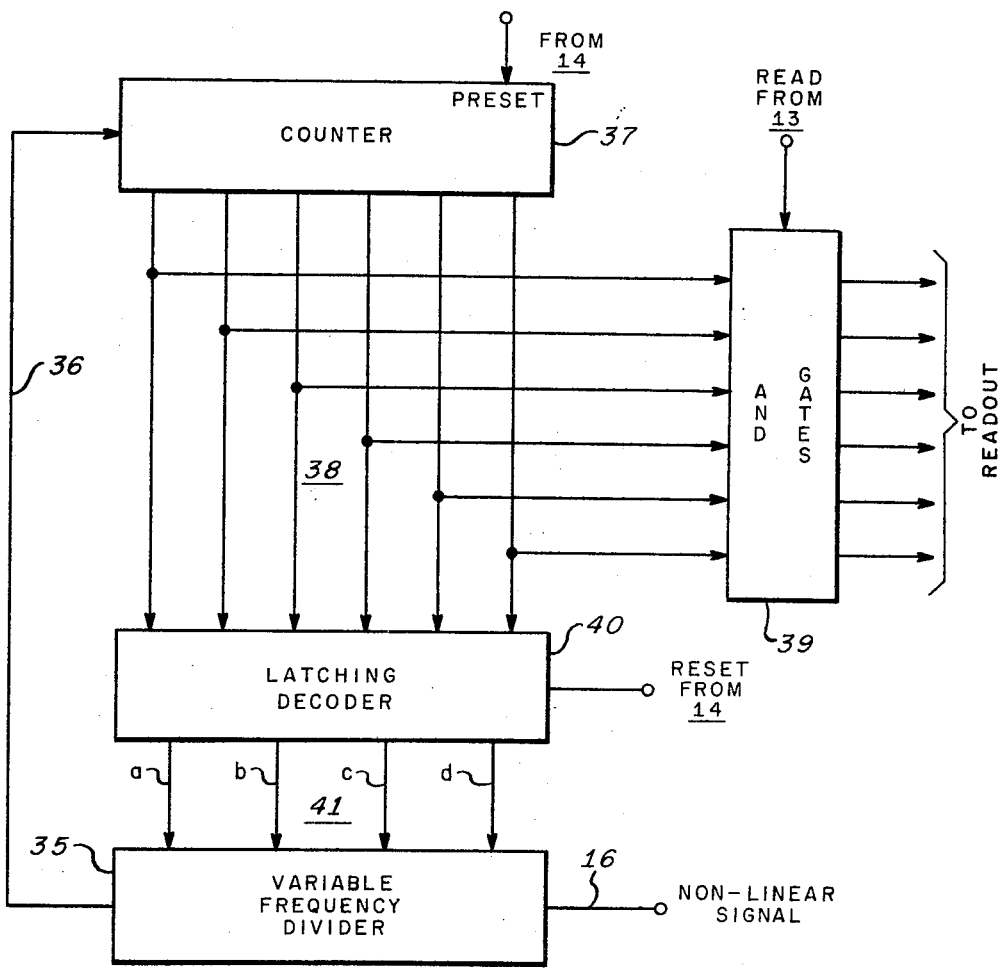
FIG. 3 is a block schematic diagram of a preferred embodiment of the invention.

Referring to FIG. 3, the linearizing apparatus is illustrated in which the non-linear signal from the AND gate 12 of FIG. 1 is applied on the lead 16 to a variable frequency divider 35. The variable frequency divider 35 multiplies the non-linear signal on the lead 16 by selectively controlled multiples, which in the present embodiment are less than and equal to unity. The variable frequency divider 35 thus provides groups of pulses on a lead 36 corresponding to the input groups of pulses on the lead 16 with the number of pulses in the groups being diminished in accordance with the controlled multiples selected.

The pulse group signals on the lead 36 are applied to a conventional counter-accumulator 37 which in turn provides conventional digital count condition signals on leads 38, which signals correspond to the number of pulses counted of the signal on the lead 36. The counter-accumulator 37 may be preset to a predetermined count by the reset signal on the lead 14 (FIG. 1) for reasons to be explained.

The digital signals on the leads 38 which are applied to AND gates 39 are representative of the desired linearized function of the non-linear signal applied on the lead 16. The read signal from the lead 13 (FIG. 1) is applied to the AND gates 39 to strobe the linear altitude data to a suitable readout device, not shown.

The digital count condition signals on the leads 38 are also applied to a latching decoder 40. The latching decoder 40, in turn, provides signals on leads 41 corresponding to predetermined count conditions of the counter-accumulator 37. The reset signal on the lead 14 (FIG. 1) is also applied to the latching decoder 40. When the reset signal is applied, the latching decoder 40 energizes the lead 41a. When the counter-accumulator 37 attains the zero count, the lead 41a is de-energized and the lead 41b is energized. In a similar manner, when the counter-accumulator 37 attains the count representative of the difference differenec in count between the points 25 and 26 of FIG. 2, the lead 41b is de-energized and the lead 41c is energized. Similarly, attainment of the count representative of the difference in count between the points 25 and 27 of FIG. 2 by the counter-accumulator 37 causes the latching decoder 40 to de-energize the lead 41c and to energize the lead 41d. The lead 41d remains energized until the next occurring reset signal whereupon the lead 41a is again energized. The latching decoder 40 may be regarded as controlling means for providing discrete controlling signals on the leads 41. The leads 41 are connected to the variable frequency divider 35 for selecting the controlled multiples previously discussed.

The operation of the apparatus of FIG. 3 will be explained with respect to linearizing the curve 20 of FIG. 2. As previously discussed, the curve 20 is approximated by linear segments 21, 22 and 23 having gradients of 12 feet per pulse, 6 feet per pulse and 4 feet per pulse respectively. In addition, the linear segment 21 intersects the pulse count axis at a non-zero count designated by reference numeral 25 and representative of zero feet of altitude. The reset signal from the lead 14 initializes the linearizing apparatus by presetting the counter-accumulator 37 to a count equal to the maximum capacity thereof minus the count at the point 25. The reset signal on the lead 14 also causes the latching decoder 40 to energize the lead 41a, as previously discussed. The energized lead 41a causes pulses to be applied to the lead 36 and hence counted in the accumulator 37. Because of the previously discussed preset condition, the accumulator 37 attains the zero count upon accumulating a number of pulses equal to the pulse count at the point 25 which corresponds to zero altitude as previously explained. When the counter 37 attains the zero count, the zero count condition signal on the leads 38 causes the latching decoder 40 to de-energize the lead 41a and to energize the lead 41b. The energized lead 41b selects a multiple of unity for the variable frequency divider 35. Thus pulse groups on the lead 16 provided by the sensor in accordance with the segment 21 are transmitted substantially unaltered to the lead 36 by the variable frequency divider 35. As previously mentioned, these pulses have a gradient of 12 feet per pulse.

When the sensor is subjected to the altitude designated by reference numeral 28 of FIG. 2, pulses are provided on the lead 16 corresponding to the break point 29 between the segments 21 and 22. When this occurs, the counter 37 is accumulating pulse groups having pulses equal in number to the count 26 minus the count 25 as evident from the illustration of FIG. 2. Thus, at the break point 29, the counter 37 provides a count condition signal on the leads 38 representative of the pulse count difference between the points 26 and 25. Responsive to this count condition signal, the latching decoder 40 de-energizes the lead 41b and energizes the lead 41c. Thus it is appreciated, from the foregoing, that the lead 41b when energized provides a signal to control the linearizing of the curve 20 over the segment 21.

In a similar manner, the energized lead 41c provides a signal to control the linearizing of the curve 20 over the segment 22. Since the sensor pulses provided in accordance with the segment 22 have an approximate gradient of 6 feet per pulse, the energized lead 41c selects a multiple of 1/2 for the variable frequency divider 35. Hence, over the segment 22, one pulse is transmitted to the lead 36 for every two pulses applied on the lead 16. It is readily appreciated that the gradient for these transmitted pulses is changed from 6 feet per pulse to 12 feet per pulse by the variable frequency divider 35. Thus, the slope of the segment 22 is reduced so that the segment 22 becomes collinear with the segment 21.

In a manner similar to that described with respect to the break point 29, when the sensor detects an altitude corresponding to the reference numeral 30, the break point 31 is detected by reason of the counter 37 providing a count condition signal on the leads 38 representative of the count 27 minus the count 25. This count condition causes the latching decoder 40 to de-energize the lead 41c and to energize the lead 41d. The energized lead 41d controls the variable frequency divider 35 to select the multiple 1/3. Thus for every three pulse applied on the lead 16, one pulse is transmitted to the lead 36. Since the sensor pulses provided in accordance with the segments 23 have a gradient of approximately 4 feet per pulse, it is appreciated that the multiple of 1/3 changes this gradient to the gradient of 12 feet per pulse in a manner similar to that described with respect to the segment 22. Hence, the segment 23 is caused to be collinear with the segment 21 in the same manner as that described with respect to the segment 22. Since the slopes of both the segments 22 and 23 are altered so that these segments are collinear with the segment 21, the linear output curve 24 is generated.

The detailed structure and operation of the apparatus illustrated in FIG. 3 will now be explained with respect to FIGS. 3a–d.

Figure 3A:
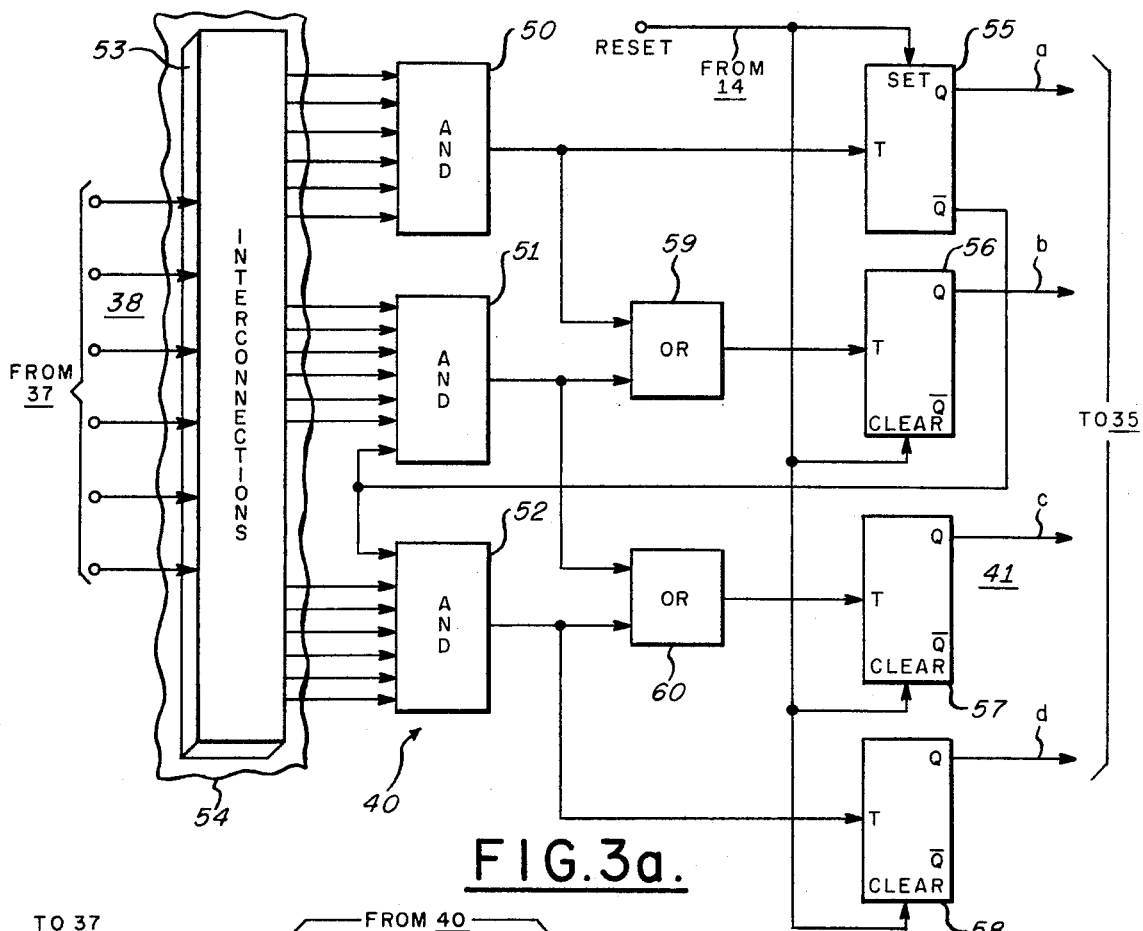
FIG. 3a–d are block schematic diagrams showing detailed logic circuits of the components of FIG. 3.

Referring to FIG. 3a in which like reference numerals designate like components with respect to FIG. 3, the latching decoder 40 is illustrated. The count condition signals from the counter-accumulator 37 on the leads 38 are coupled to AND gates 50, 51 and 52 via interconnections 53. The interconnections 53 are arranged so that the inputs to each of the AND gates 50, 51 and 52 may be coupled to the respective stages of the counter 37 so as to detect predetermined count conditions thereof. The AND gate 50 is coupled to the counter 37 so as to detect the zero count. The AND gate 51 is coupled to the counter 37 so as to detect the count equal to the difference of the counts at the points 25 and 26 of FIG. 2. In a similar manner, the AND gate 52 is coupled to the counter 37 to detect the count equal to the difference in counts between the points 25 and 27 of FIG. 2. The interconnections 53 are mounted to a pluggable mounting member 54 for reasons to be discussed.

The latching decoder 40 further includes triggerable flip-flops 55, 56, 57 and 58, the Q outputs of which provide the previously described controlling signals on the leads 41a, b, c and d, respectively. The $\bar{Q}$ output of the flip-flop 55 provides inhibiting signals to the AND gates 51 and 52 for reasons to be explained. The reset signal on the lead 14 is applied to the set input of the flip-flop 55 and to the clear inputs of the flip-flops 56, 57 and 58 for reasons to be discussed.

The output of the AND gate 50 is connected to the trigger input of the flip-flop 55 and is also connected to the trigger input of the flip-flop 56 via an OR gate 59. The output of the AND gate 51 is connected to the trigger input of the flip-flops 56 and 57 via the OR gate 59 and an OR gate 60, respectively. The output of the AND gate 52 is connected to the trigger input of the flip-flop 57 via the OR gate 60 and is also connected directly to the trigger input of the flip-flop 58.

In operation, the reset signal on the lead 14 sets the flip-flop 55 to the Q state and clears the flip-flops 56, 57 and 58 to the $\bar{Q}$ states. Hence, the lead 41a is energized and the leads 41b, c and d are de-energized. As previously explained, the energized lead 41a causes the variable frequency divider 35 (FIG. 3) to apply pulses to the preset counter 37. When the counter 37 counts out the preset value, thus attaining the zero condition, the AND gate 50 is enabled. Thus when the counter 37 attains the zero count, the flip-flop 55 is toggled to the $\bar{Q}$ state and the flip-flop 56 is toggled to the Q state, hence de-energizing the lead 41a and energizing the lead 41b as previously discussed. It is appreciated that while the counter 37 is counting out the preset value, the $\bar{Q}$ output of the flip-flop 55 inhibits the AND gates 51 and 52. This is done so that if either of the counts to which the AND gates 51 and 52 are responsive is achieved in counting out the preset value, faulty operation will be precluded.

As previously discussed, the energized lead 41b controls the operation of the variable frequency divider 35 over the segment 21 of FIG. 2. When the count corresponding to the break point 29 (FIG. 2) is attained by the counter 37, the AND gate 51 is enabled. The enabled output of the AND gate 51 toggles the flip-flop 56 to the $\bar{Q}$ state and the flip-flop 57 to the Q state. Thus, the lead 41c is energized controlling the operation of the device over the segment 22 (FIG. 2). In a similar manner, attainment of the count corresponding to the break point 31 causes the flip-flop 57 to be toggled to the $\overline{Q}$ state and the flip-flop 58 to be toggled to the Q state via the AND gate 52. Thus, the lead 41d is energized controlling the operation of the apparatus over the linear segment 23 (FIG. 2) until the generation of the next following reset pulse.

Figure 3B:
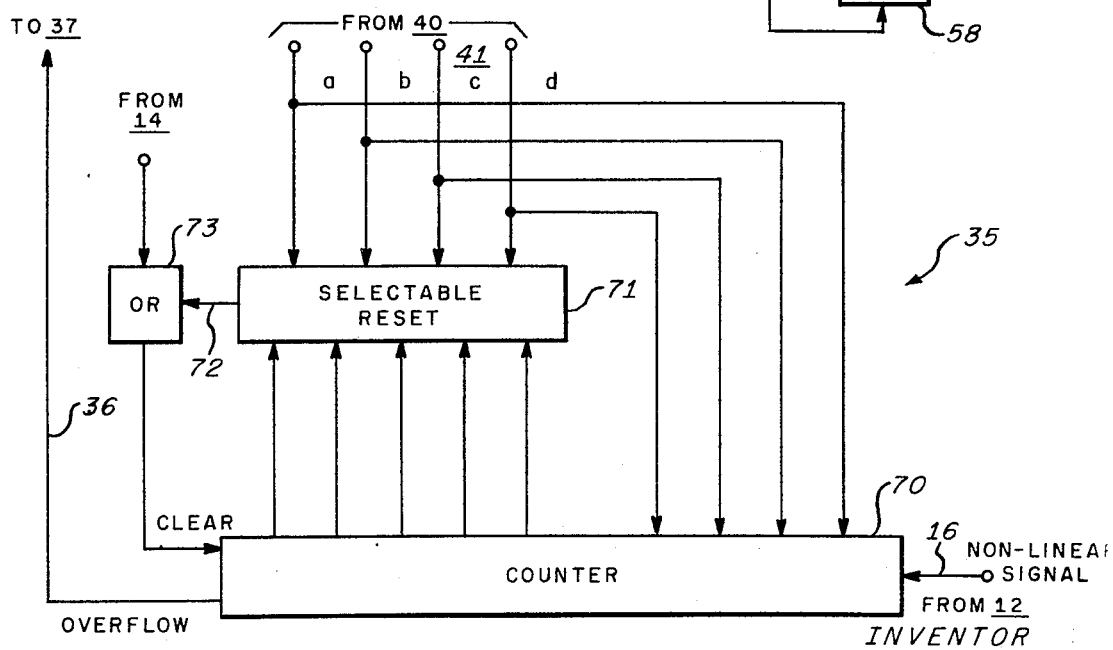

Referring to FIG. 3b, in which like reference numerals refer to like components with respect to FIG. 3, the variable frequency divider 35 is illustrated. The non-linear signal on the lead 16 is applied as the input to a conventional binary counter 70. The overflow signal from the counter 70 provides the pulses to the accumulator 37 via the lead 36 as previously discussed. The stages of the counter 70 are connected to selectable reset circuits 71 which are also responsive to the controlling signals on the leads 41. The circuits 71 are responsive to predetermined counts of the counter 70 in accordance with the signals on the leads 41 to provide a clearing signal on a lead 72. The clearing signal on the lead 72 is applied to the clear input of the counter 70 via an OR gate 73. The OR gate 73 is additionally responsive to the reset signal on the lead 14. The counter 70 is further responsive to the controlling signals on the leads 41 to apply the non-linear signal on the lead 16 to selected input stages thereof in a manner and for reasons to be explained.

In operation, before the receipt of a pulse group, the counter 70 is cleared to the zero count by the reset pulse applied via the OR gate 73 from the lead 14. While the counter 37 is counting out the preset value as previously explained with respect to FIG. 3 and the lead 41a is energized, the counter 70 is caused to transmit pulses via the lead 36, until the accumulator 37 attains the zero count. The lead 41b is thus energized, as previously explained, causing the circuits 71 to be responsive to the one count of the counter 70. When the counter 70 attains the count of one, the selectable reset circuit 71 provides the clearing signal on the lead 72 clearing the counter 70 back to the zero count. Hence, the circuit 71 selects the multiple of unity as required to linearize the curve 20 (FIG. 2) over the segment 21 (FIG. 2) as previously described.

When the lead 41c is energized, the selectable reset circuits 71 are responsive to the two count of the counter 70. Hence, the multiple of 1/2 is selected as required to linearize the curve 20 over the segment 22 as previously discussed. In a similar manner, when the lead 41d is energized, the selectable reset circuits 71 are rendered responsive to the three count of the counter 70. Hence, the multiple 1/3 is selected as required to linearize the curve 20 over the segment 23 as hereinabove explained.

Figure 3C:
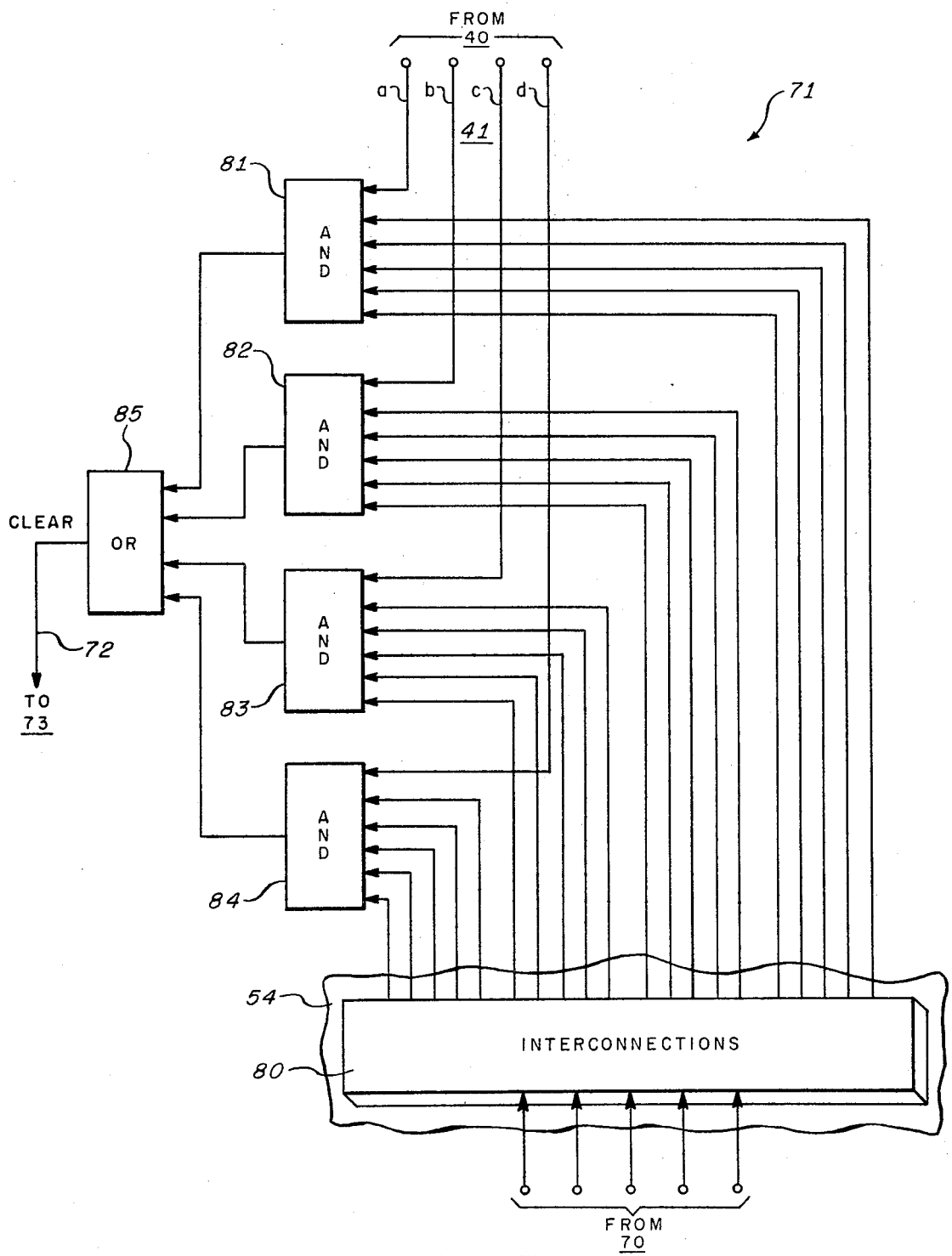

Referring to FIG. 3c in which like reference numerals indicate like components with respect to FIGS. 3 and 3b, the selectable reset circuits 71 of FIG. 3b are illustrated. The count signals from the stages of the counter 70 are applied to interconnections 80. The interconnections 80 are affixed to the pluggable mounting member 54 previously discussed with respect to FIG. 3a. The interconnections 80 provide inputs to AND gates 81, 82, 83 and 84 which are also responsive to the controlling signals on the leads 41a, b, c and d respectively. The AND gates 81–84 provide inputs to an OR gate 85 whose output provides the clearing signal on the lead 72 as previously explained with respect to FIG. 3b.

The interconnections 80 are so arranged that each of the AND gates 81–84 may receive input from any combination of the stages of the counter 70 (FIG. 3b). Thus it is appreciated that each of the AND gates 81–84 may be responsive to any selected count of the counter 70 in accordance with the wiring of the interconnections 80. In the embodiment of the invention hereinabove described with respect to FIG. 2, the AND gate 81 may be arbitrarily responsive to any low valued count of the counter 70. The AND gate 82 is connected to be responsive to the count of unity of the counter 70. Similarly, the AND gates 83 and 84 are connected to be responsive to the counts of two and three of the counter 70 respectively. Thus, when the respective controlling leads 41a–d are energized as previously described, the respective AND gates 81–84 provide the clearing signal on the lead 72 via the OR gate 85 as required in accordance with the above-described embodiment of the invention.

Figure 3D:
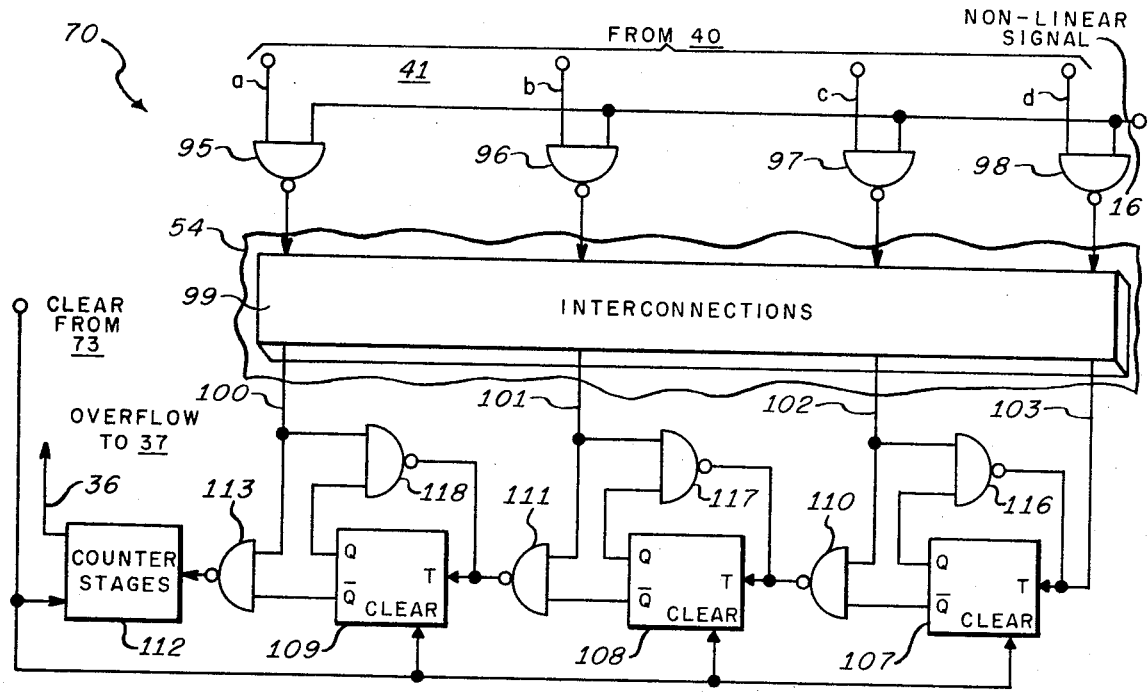

Referring now to FIG. 3d in which like reference numerals indicate like components with respect to FIG. 3, 3b and 3c, details of the counter 70 are illustrated. The signals on the controlling leads 41a–d are applied through NAND gates 95, 96, 97 and 98 to interconnections 99. The non-linear signal on the lead 16 is also applied as inputs to the NAND gates 95–98. The interconnection circuits 99 are affixed to the pluggable mounting member 54 in a manner similar to that described with respect to FIG. 3c. The interconnections 99 may be wired so that the NAND gates 95–98 are connected to leads 100, 101, 102 and 103 in an arrangement to effect the selectively controlled multiples of the variable frequency divider 35 (FIG. 3) in a manner to be explained.

The counter 70 includes three input flip-flop stages 107, 108 and 109 that are interconnected in conventional counter arrangement via NAND gates 110 and 111, respectively. The stage 109 is connected to conventionally configured counter stages 112 via a NAND gate 113. The pulse signals on the lead 36 to the counter-accumulator 37 (FIG. 3) as previously discussed, are provided by the overflow signal from the counter stages 112. The clearing signal from the OR gate 73 (FIG. 3b) is applied to clear the counter stages 112 to zero in a conventional manner, and is also applied to the clear inputs of the stages 107–109. The leads 100–103 are coupled to the counter stages 112, 109, 108 and 107, respectively, through the NAND gates 113, 111 and 110. Thus it is appreciated that the NAND gates 95–98 are selectively coupled to the counter stages 112, 109, 108 and 107 in accordance with the wiring of the interconnections 99. Hence, the controlled multiples of the variable frequency divider 35 (FIG. 3) may be changed by selected factors of powers of two. The circuits 112 may include as many connected counter stages as are required to conveniently effect the desired controlled multiples. In the embodiment described above, the multiples of unity, 1/2 and 1/3, may conveniently be instrumented with two counter stages 112 and the NAND gates 95–98 all connected to the lead 100 by the interconnections 99.

NAND gates 116, 117 and 118 are connected between the Q outputs and the trigger inputs of the flip-flops 107, 108 and 109, respectively. The NAND gates 116, 117 and 118 also receive inputs from the leads 102, 101 and 100, respectively. The NAND gates 116–118 are included to prevent lock-up of the counter 70. This will be explained by way of an example where the NAND gates 95–98 are coupled to the leads 100–103, respectively, by the interconnections 99. For example, if the lead 41b becomes energized when the flip-flop 108 is in the Q state, the NAND gate 111 will be disabled, causing the operation of the counter 70 to lock up. Since, however, the flip-flop 1-8 is in the Q state, the NAND gate 117 is enabled, hence providing a signal to toggle the flip-flop 108 to the $\bar{Q}$ state, eliminating the lock-up condition.

It is appreciated from FIGS. 3b, 3c and 3d that a wide range of selectively controlled multiples may be effected commensurate with the characteristics of the non-linear signal applied to the lead 16 by appropriate wiring of the interconnections 80 and 99 and a propitious selection for the number of counter stages 112.

As previously described, the interconnections 53, 80 and 99 are affixed to the pluggable mounting member 54. The sensor whose output signal is linearized by the apparatus hereinabove described, may also be affixed thereto. In this manner, the parameters required to linearize the output of a particular sensor may be physically associated therewith. Hence, when one sensor is replaced by another sensor for maintenance purposes for example, the associated linearizing parameters are also changed by this simple plugging arrangement.

For the embodiment hereinabove described, the curve 20 of FIG. 2 was chosen for purposes of explanation. In practical applications of the invention many more than three linearizing segments may be utilized to achieve the required system accuracy without departing from the spirit and scope of the invention. Additionally, the slope of the linear output curve 24 need not be chosen coincident with the slope of any of the linearizing segments in practicing the invention.

It is appreciated that although the hereinabove described embodiment of the invention was explained in terms of a variable frequency divider, a variable frequency multiplier providing selectively controlled multiples of unity and greater than unity may be utilized to the same effect. With this arrangement, the slope of the linear output curve 24 should be equal to or greater than the largest slope of the linearizing segments.

It is further appreciated that although the invention was explained in terms of an altitude pressure sensor, the non-linear signal applied to the lead 16 may be derived from a wide variety of sources. Furthermore, the outputs from the counter-accumulator 37 through the AND gates 39 of FIG. 3 are suitable for application to digital computation equipment of types commonly used in the art.

The invention was schematically illustrated and described in terms of AND and OR components to explain the logic of the apparatus. It is understood that NAND/NOR logic may be utilized to instrument the AND and OR circuits in a conventional manner. The NAND/NOR gates of the lock-up preventive circuits of the counter 70 are, in fact, illustrated in FIG. 3d.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for linearizing a non-linear signal comprising frequency altering means responsive to said non-linear signal for providing a second signal with frequency being a selectively controlled multiple of the frequency of said non-linear signal,
   counting means responsive to said second signal for counting the cycles thereof, and
   controlling means coupled to said counting means for changing said selectively controlled multiple from a first predetermined multiple to a second predetermined multiple whenever said counting means attains a predetermined count condition.

2. Apparatus of the character recited in claim 1 in which said counting means comprises first pulse counter means responsive to said second signal for providing count condition signals representative of the number of cycles counted of said second signal said count condition signals providing a linear function of said non-linear signal.

3. Apparatus of the character recited in claim 1 in which said controlling means includes means for providing a first controlling signal for selecting said first predetermined multiple before said counting means attains said predetermined count condition and a second controlling signal thereafter for selecting said second predetermined multiple.

4. Apparatus of the character recited in claim 3 in which said controlling means further includes means for inhibiting said first and second controlling signals until said counting means attains a reference count condition.

5. Apparatus of the character recited in claim 4 in which said controlling means further includes first intercoupling means coupled to said counting means for changeably selecting said predetermined count condition and said reference count condition.

6. Apparatus of the character recited in claim 1 in which said frequency altering means comprises frequency dividing means.

7. Apparatus of the character recited in claim 6 in which said frequency dividing means includes
   second pulse counter means responsive to said non-linear signal the overflow signal thereof providing said second signal, and
   selecting means responsive to said controlling means for selecting said selectively controlled multiple.

8. Apparatus of the character recited in claim 2 having said controlling means responsive to said count condition signals for providing a first controlling signal for selecting said first predetermined multiple before said first pulse counter means provides a predetermined count condition signal and a second controlling signal thereafter for selecting said second predetermined multiple.

9. Apparatus of the character recited in claim 8 in which said controlling means further includes inhibiting means for inhibiting said first and second controlling signals until said first pulse counter means provides a reference count condition signal.

10. Apparatus of the character recited in claim 9 in which said controlling means further includes first intercoupling means responsive to said count condition signals for changeably selecting said predetermined count condition signal and said reference count condition signal.

11. Apparatus of the character recited in claim 10 in which said frequency altering means comprises frequency dividing means.

12. Apparatus of the character recited in claim 11 in which said frequency dividing means includes second pulse counter means responsive to said non-linear signal the overflow signal thereof providing said second signal, and selecting means for selecting said first and second predetermined multiples in response to said first and second controlling signals respectively.

13. Apparatus of the character recited in claim 12 in which said selecting means comprises resetting means operable in response to said first controlling signal for resetting said second pulse counter means to a reference state whenever said second pulse counter means attains a first predetermine count and operable in response to said second controlling signal for resetting said second pulse counter means to said reference state whenever said second pulse counter means attains a second predetermined count, thereby selectively providing said first and second predetermined multiples, respectively.

14. Apparatus of the character recited in claim 13 in which said resetting means includes second intercoupling means coupled to said second pulse counter means for changeably selecting said first and second predetermined counts.

15. Apparatus of the character recited in claim 12 in which said selecting means further includes coupling means for coupling said non-linear signal to a first or second stage of said second pulse counter means in response to said first or second controlling signal, respectively.

16. Apparatus of the character recited in claim 14 in which said apparatus is responsive to condition sensor means providing said non-linear signal varying in accordance with a non-linear function of a condition.

17. Apparatus of the character recited in claim 16 in which said apparatus includes pluggable mounting means to which are affixed said condition sensor means and said first and second intercoupling means thereby selecting for said condition sensor means the parameters required to linearize said non-linear signal, said parameters including said predetermined count condition signal, said reference count condition signal, and said first and second predetermined counts.

18. Apparatus of the character recited in claim 16 in which said condition sensor means comprises an atmospheric pressure sensor.

* * * * *